US008396747B2

(12) United States Patent
Bachenheimer

(10) Patent No.: US 8,396,747 B2
(45) Date of Patent: Mar. 12, 2013

(54) IDENTITY THEFT AND FRAUD PROTECTION SYSTEM AND METHOD

(75) Inventor: Steven I. Bachenheimer, Aventura, FL (US)

(73) Assignee: Kemesa Inc., Salt Lake City, UT (US)

( * ) Notice: Subject to any disclaimer, the term of this patent is extended or adjusted under 35 U.S.C. 154(b) by 1912 days.

(21) Appl. No.: 11/245,502

(22) Filed: Oct. 7, 2005

(65) Prior Publication Data

US 2007/0083460 A1  Apr. 12, 2007

(51) Int. Cl.
*G06Q 20/00* (2012.01)
(52) U.S. Cl. ............................ 705/18; 705/16
(58) Field of Classification Search .................. None
See application file for complete search history.

(56) References Cited

U.S. PATENT DOCUMENTS

| | | |
|---|---|---|
| 6,456,984 B1 | 9/2002 | Demoff et al. |
| 6,636,833 B1 | 10/2003 | Flitcroft et al. |
| 6,839,692 B2 | 1/2005 | Carrott et al. |
| 7,689,007 B2 | 3/2010 | Bous et al. |
| 2001/0044785 A1 * | 11/2001 | Stolfo et al. ............... 705/74 |
| 2002/0116341 A1 | 8/2002 | Hogan et al. |
| 2002/0120530 A1 | 8/2002 | Sutton |
| 2003/0023549 A1 | 1/2003 | Armes |
| 2003/0028481 A1 * | 2/2003 | Flitcroft et al. ............. 705/39 |
| 2003/0028493 A1 * | 2/2003 | Tajima et al. ............... 705/67 |
| 2003/0187787 A1 | 10/2003 | Freund |
| 2004/0179682 A1 | 9/2004 | Soliman |
| 2004/0215576 A1 | 10/2004 | Sutton |
| 2004/0254893 A1 * | 12/2004 | Tsuei et al. ............... 705/74 |
| 2006/0045270 A1 | 3/2006 | Cohen |

FOREIGN PATENT DOCUMENTS

| | | |
|---|---|---|
| KR | 2001-0100748 A | 11/2001 |
| KR | 10-0581342 B1 | 5/2006 |

OTHER PUBLICATIONS

Office Action from U.S. Appl. No. 12/083,147, dated Aug. 30, 2010.
Korean Office Action (Final) from Korean Intellectual Property Office, dated Aug. 28, 2010 (3 pages).

* cited by examiner

*Primary Examiner* — Paul Danneman
(74) *Attorney, Agent, or Firm* — Robert M. Downey, P.A.

(57) ABSTRACT

A system and method for preventing personal identity theft when making online and offline purchases requires a purchaser to first subscribe and become a member user by registering and providing relevant personal identity information. Once registered, the member is assigned a user name and a password. The subscribing member's personal identity information is then encrypted and stored at one or more highly secure locations. The ID protection system obtains a controlled use card (CUC) through a CUC issuer on behalf of the member for use to make each purchase transaction. The CUC is anonymous with respect to user (member) identity and may be a purchase-specific single-use card or a multiple-use stored value card with no traceable connection to any other financial account. When the member makes a secure online purchase, the system software enters anonymous information (i.e. not revealing the member's real name, email address, billing information, etc.) on the merchant's order placement screen, except in instances where the member's real identity information is required (e.g. airline tickets). The merchant receives the completed checkout screen, obtains credit approval through a credit card association, and sends the shipping information to a shipper which independently obtains the correct shipping name and address from the ID protection system prior to shipping the purchased product(s).

42 Claims, 5 Drawing Sheets

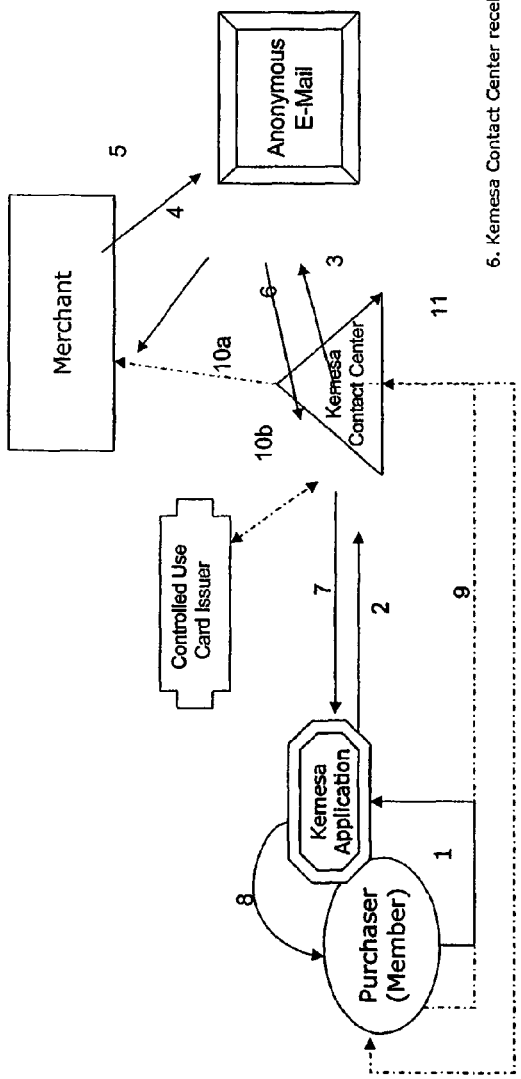

IDENTITY THEFT AND FRAUD PROTECTION SYSTEM AND METHOD

BACKGROUND OF THE INVENTION

1. Field of the Invention

The present invention relates to identity theft protection and, more particularly, to a system and method for protection against theft of personal identity information when conducting both online and offline purchase transactions.

2. Discussion of the Related Art

Identity theft is one of the fastest growing crimes in the world, and is becoming increasingly sophisticated and difficult to prevent. In the United States alone, the Federal Trade Commission (FTC) reports that victim complaints have increased exponentially between the years 2000 and 2004. In many instances, identity thieves obtain personal identity information of a large number of individuals by stealing data from one or more databases. The personal information compromised often includes data elements such as Social Security numbers, account numbers, telephone numbers, addresses and driver's license numbers of thousands of victims.

The FTC estimates that since the year 2000 at least 10 million people have had criminals open new credit card or bank accounts, secure utilities services, or apply for mortgages or other loans under the victims' names with the use of stolen identity information. Moreover, it is reported that the personal data of nearly 50 million Americans have been exposed in the year 2005 alone, with as many as 1 in 6 people now being vulnerable to identity theft.

For people whose identities have been stolen, it can take months, and sometimes years, and thousands of dollars to correct the damage. Until the problem is resolved, victims of identity theft may lose job opportunities, be refused loans, and even get arrested for crimes they didn't commit. Additionally, criminals may open new credit card accounts in the victims' names and then run up charges that they will never pay. The victims' personal identity information may also be used to establish telephone or wireless service in the victims' names. Identity thieves have also been known to open bank accounts in victims' names and write bad checks on those accounts. In other instances, criminals may counterfeit checks, credit cards or debit cards, or authorize electronic bank transfers that drain the funds from a bank account.

Theft of personal identity information from computers and online (e.g. the Internet) environments is particularly problematic and widespread. The two primary means of misappropriating personal identity information in an online environment are database theft/hacking and phishing. Database hacking typically involves theft of identity information of a large number of victims from a centralized storage source, such as a merchant or credit card transaction processor database. Phishing scams involve fraudulent requests for information from consumers, usually via email messages, and are now the most rapidly expanding method of identity theft. Phishing scammers typically forge the "from" field of an email message so that it appears to be from a reputable company, such as a well-known merchant or bank. The message urges the recipient to click on a link in the email message in order to update account information under the premise that the company suspects that the email recipient's account has been tampered with. The link leads to a website that looks credible and requests the unsuspecting recipient to type in his/her personal information, which may include their Social Security number, bank account number and credit card numbers.

As mentioned above, personal identity information of a large number of individuals is often obtained by stealing/hacking data from one or more databases. In virtually all cases, such thefts have occurred from unencrypted databases. In many instances, theft of identity information from a central data storage location is a result of an "inside job" by an employee who may have authorized access to the database. In some instances, the employee may be lured into this criminal activity with payoffs from those who ultimately use the stolen identity information for their own monetary gain. In other cases, the criminal-minded employee may be a plant, having sought out the most opportunistic employment position for the primary purpose of gaining access to one or more databases containing valuable identity information of a large number of potential victims. Accordingly, the storage of personal identity information of a large number of individuals at a central data storage location is risky and renders such identity information vulnerable to theft by both "insiders" and outside hackers.

In other instances, sophisticated criminals steal a person's credit or debit card numbers by capturing the information in a data storage device in a practice known as "skimming." Identity theft can also occur when making offline purchases, particularly when a credit card is used. A thief may swipe a victim's card to capture the number and other account information, or attach a capturing device to an ATM machine where the victim inserts his/her bank card. To protect consumers, credit card companies offer various products that attempt to stop thieves from stealing credit card account information. However, these various protection products do not enable a card user to make purchases with complete anonymity. Thus, there is always a danger of theft of the user's personal identity information.

The alarming concern surrounding the rapidly growing problem of personal identity theft and credit card fraud has led to numerous proposed systems and methods aimed at preventing or reducing risk of theft or misuse of personal and financial information.

For example, U.S. Pat. No. 6,839,692 B2 to Carrott et al. discloses a method and apparatus for providing secure credit facility transactions for purchasing goods and services over a computer network, such as the Internet. The method and apparatus disclosed in Carrott et al. stores a user's privileged information and other transactional data on the user's own computer. The method includes encryption of all information before or during its storage on the user's hard drive. The method and system includes the ability for the user to complete electronic commerce transactions without revealing certain of the encrypted information, such as credit card numbers, to the merchant. Further, the method and system creates and controls sub-accounts on a single credit card facility, such as a credit card account, and controls sub-account spending amounts and replenishment periods. Unlike the present invention, as described more fully hereinafter, the method and system in Carrott et al. fails to provide maximum user anonymity throughout purchase transactions. Additionally, the system and method in Carrott et al. does not provide for access to all major credit card accounts of a user and may not allow for use at all merchant websites. When making an online purchase using the system and method in Carrott at el., the user must still provide his/her actual street address, email address and phone number. Accordingly, the system and method in Carrott at el. fails to fully protect theft of the user's personal identity information.

In U.S. Pat. No. 6,636,833 B1 and U.S. Patent Application Pub. No. US 2003/0028481 A1, both to Flitcroft et al., a credit card system and method is disclosed for providing limited use credit card numbers and/or cards to be used for a single- or limited-use transaction. The system can be used for both "card remote" transactions, such as by telephone or Internet, or for "card present" transactions. Methods for limiting, distributing and using a limited use card number, controlling the validity of a limited use credit card number, conducting a limited use credit card number transaction and providing remote access devices for accessing a limited use credit card number are also provided. Unlike the present invention, as described more fully hereinafter, the Flitcroft et al. credit card system and method fails to provide for maximum user anonymity. For instance, a user of the Flitcroft et al. credit card system is required to provide their real name and address to a Merchant when making an online purchase. Moreover, for "card present" transactions, the Flitcroft et al. credit card system reveals a name and number on the card. Additionally, a signature may be required by the user when making a "card present" transaction. According to the system of the present invention, as described hereinafter, no user identification number appears on the card for "card present" transactions and no signature is required. Additionally, the credit card system in Flitcroft et al. requires the user to enter the limited-use credit card numbers when conducting an online transaction. The system of the present invention offers greater user convenience, accuracy and security by taking responsibility for entering the controlled use card number rather than having the user/Member do so. Security is further enhanced in the system of the present invention by eliminating the distribution of single-use numbers to users/Members. Moreover, the Flitcroft et al. credit card system may require the user to reveal his/her actual email address to online Merchants. The secure email service provided under the system of the present invention provides for total anonymity so that online Merchants are unable to determine the Purchaser's email address. Further, online transmission of transaction records to Members using the system of the present invention are more secure because these transmissions occur through the System's secure email service which is less susceptible to fraud/theft than conventional user-identified emails.

U.S. Patent Application Pub. No. US 2002/0116341 A1 to Hogan et al. discloses a method and system for conducting secure payments over a computer network which uses a pseudo-expiration date in the expiration date field of an authorization request. Unlike the present invention, as described more fully hereinafter, the method and system in Hogan et al. fails to provide for maximum user anonymity. More particularly, the user of the method and system in Hogan et al. must provide their name, address, email address and credit card number when making a purchase or payment over a computer network, such as the Internet.

The U.S. Patent to Demoff et al., U.S. Pat. No. 6,456,984 B1, discloses a method and system for providing temporary credit authorizations in a consumer transaction which eliminates the need for a traditional credit card. According to Demoff et al., the system responds to a request for issuing a credit transaction number that is made concurrent with a particular transaction. The credit transaction number is then randomly generated and made valid only for the requested transaction, and automatically ages a short period of time after the request. The credit transaction numbers are continually recycled for subsequent requests irrespective of the customer identity. The request can be made from a mobile communication device or from a personal computer using an electronic commerce program. Transactions between customers and registered or known online Merchants can be automatically carried out by a centralized service provider without generating the unique, temporary number, or without the need for the customer or Merchant to exchange personal information. Unlike the system and method of the present invention, as described more fully hereinafter, the system disclosed in U.S. Pat. No. 6,456,984 B1 requires online Merchants to first register with the system and be pre-approved for secure transactions. Thus, the method and system of Demoff et al. limits user access to only online Merchants that have been pre-approved and registered with the system. Moreover, the system and method of Demoff et al. does not provide for access to all major credit cards, as selected by the user. Further, the system and method in Demoff et al. fails to provide for maximum user anonymity throughout the purchase transaction.

The current financial marketplace offers a broad array of credit card and debit card products for both general and limited use. Despite attempts to provide for added security against fraud and identity theft, all of these products, when used for "card present" transactions, have significant limitations, particularly with protection of user identity. For instance, almost all credit cards and debit cards display a user name on the card. Also, a card number directly associated with the user's account is visible on the card, along with an expiration date. In most instances, a user of a credit card will be required to sign his/her name when conducting a "card present" transaction. Additionally, since all credit card products do not require PIN entry at the point of transaction, they are easily used for fraudulent purposes if stolen.

The present invention provides the following advantages over virtually all credit-card type products presently used for "card present" transactions:

No name on card
No card numbers are visible
No expiration date is visible
Member signature is not required (provided electronically)
Of no value if stolen without PIN entry
Limited exposure by allowing the user to control the value of the card to an amount less than the full credit line.

The current financial industry also offers an array of products for "card-not-present" transactions. These products fall into a number of different major categories including:

Wallets (PAY PAL, YAHOO)—this is a system of prearranged charge "centers" that debit purchases against designated credit cards or financial accounts.

Conventional Credit Cards (VISA, MASTERCARD, DISCOVER and AMERICAN EXPRESS)—cards with assigned account numbers that access the full credit lines of the established credit card accounts.

Debit Cards—usually require entry of a PIN at place of transaction and are directly tied to a bank account or other financial accounts (not a credit card account) that are automatically debited after the purchase transaction. Theft or unauthorized use exposes the entire balance in the linked bank account to possible theft.

Association-Based Controlled Use Credit Cards (verified by VISA, MASTER SECURE)—employ controlled use credit cards with use being generally limited to participating Merchants.

Card Issuer-Based Controlled Use Credit Cards (CITIBANK, MBNA)—similar to the above association-based controlled use credit cards, but usually not restricted to participating Merchants.

The following table summarizes the considerable advantages of the system and method of the present invention versus these above-identified products:

| Description of Benefit | Present Invention | Wallet | Credit Card | Debit Card | Association Controlled Credit Card | Issuer Controlled Credit Card |
| --- | --- | --- | --- | --- | --- | --- |
| Name not revealed | P | | | | | |
| Real Credit Card #s not requested during online purchase | A | A | | | | |
| Real Credit Card #s or other usable account # not revealed to Merchant | A | | | | A | A |
| Billing information not revealed | A | A | | | | |
| Street Address not revealed | A | | | | | |
| Shipping address not revealed | P | | | | | |
| Email address not revealed | P | | | | | |
| Phone number not revealed | P | | | | | |
| Virtual Passwords | A | | | | | |
| Usable at any merchant site | A | | | | | A |
| Personal Identity Info not stored at Merchant central data locations | A | | | | | |
| Access to all credit cards Member wishes to use | A | A | | | | |
| Usable at any Merchant website | A | | A | P | | |
| Automatic Merchant form fill of standard purchase information | A | | | | | |
| One-step access from Member desktop | A | | A | A | Discover Only (P) | |
| No major extra steps by Member during purchase | A | | A | A | | |

A = Benefit always provided
P = Benefit partially or sometimes provided

OBJECTS AND ADVANTAGES OF THE INVENTION

Considering the foregoing, it is a primary object of the present invention to eliminate the theft of a Purchaser's personal identity information by providing maximum anonymity throughout the purchasing process.

It is a further object of the present invention to provide a system and method for preventing theft of a Purchaser's personal identity information as a result of a purchase transaction, either online or offline.

It is yet a further object of the present invention to provide a system and method for preventing theft of a Purchaser's personal identity information, and wherein no useable aspect of the Purchaser's personal identity information is stored at any merchant's or third party data storage location, thereby precluding the theft of usable personal identity information by or from the merchant or any third party.

It is still a further object of the present invention to provide a system and method for preventing theft of a purchaser's personal identity information which does not require the purchaser to communicate any differently with a selected Merchant.

It is still a further object of the present invention to provide a system and method for preventing theft of a Purchaser's personal identity information which provides proprietary and impenetrably encrypted storage of its member's personal identity information that is obtained during registration.

It is still a further object of the present invention to provide a system and method for preventing theft of a Purchaser's personal identity information which requires no change in habits or practices of the Purchaser or Merchant.

It is still a further object of the present invention to provide a system and method for preventing theft of a Purchaser's personal identity information during an online (e.g. Internet) purchase transaction, and wherein the procedure is not meaningfully changed from the Purchaser's perspective and, further, wherein the Purchaser's responses to Merchant order placement and checkout screens appear identical in kind to those of any new customer from the Merchant's perspective, thereby facilitating maximum purchase anonymity.

It is still a further object of the present invention to provide a system and method for preventing theft of a Purchaser's personal identity information as a result of an offline purchase transaction, and wherein the Purchaser is provided with an anonymous offline purchasing account and a limited-use card associated with that account, and further wherein the card is adapted to be read by conventional credit card reading devices of Merchants without revealing the Purchaser's name, account number, expiration date or any other personal identity information not absolutely necessary to complete the transaction, thereby providing maximum anonymity throughout the transaction.

It is yet a further object of the present invention to provide a system and method for preventing theft of a Purchaser's personal identity information, wherein the user is not required to enter his/her actual credit card information online in order to obtain a controlled use card.

It is still a further object of the present invention to provide a system and method for preventing theft of a Purchaser's personal identity information during an online purchase transaction, and wherein the user is able to obtain a controlled use card directly from the system without having to visit other websites in order to complete the process of obtaining the controlled use card.

It is still a further object of the present invention to provide a system and method for preventing theft of a Purchaser's personal identity information during an online purchase transaction, and wherein the system provides virtual passwords which change automatically with each transaction and/or Merchant even though the Purchaser always enters the same known password chosen by the Purchaser at the time of registration for use of the system.

It is still a further object of the present invention to provide a system and method for preventing theft of a Purchaser's personal identity information by providing maximum anonymity throughout the purchase transaction, and wherein the Purchaser's true identity information is always obtainable by the System for security purposes, such as for Homeland Security concerns.

It is still a further object of the present invention to provide a system and method for preventing theft of a Purchaser's personal identity information while also protecting the system from fraudulent use of its services by incorporating a non-repudiation feature in the form of a digital (i.e. electronic) signature used to authenticate identity, thereby providing undeniable evidence that a transaction occurred and identifying the person who conducted the transaction.

BRIEF SUMMARY OF THE INVENTION

The present invention is directed to a system and method for preventing theft of a purchaser's personal identity information as a result of a purchase transaction, either online or offline. As used throughout the specification and claims which follow, the term "online", when used to describe a type of transaction, means "Card-not-present" or "not physically at the merchant location." Moreover, the term "offline", as used throughout the specification and claims to describe or classify a type of transaction, means "card present" or "physically at the merchant location".

The purchaser first subscribes to become a member user of the ID protection system and registers by providing relevant personal identity information and downloading a software application for installation on the member's computer, at which time the member receives a user name and a password. Once recorded by the ID protection system, the member's personal identity information is highly guarded by the system and never stored in a database that is accessible to others, such as a Merchant or processor's central data storage location. In a preferred embodiment, all member's personal identity information is encrypted using 128-bit SSL encryption and stored at one or more secure storage locations that are only accessible by the system. In one embodiment, the personal identity information may be fragmented, before or after encryption, and stored at multiple data storage locations. In another embodiment, the personal identity information of Members is encrypted in multiple layers prior to storage. When needed by the ID protection system, the member's personal identity information is retrieved from the one or more storage locations for a limited time and then the information is again encrypted for secure storage. The member can then elect to make secure purchases using the system for both online and offline purchase transactions. In all cases, online and offline, the purchaser's real credit card information is not revealed and the transaction is made with a controlled use card.

When making an online ID-protected purchase at a merchant website via a global computer network (e.g. the Internet), the system software application is activated and the member is prompted to enter his/her user name and password. When the merchant presents an order placement screen, the system software application enters ID-protected purchase information using anonymous information, except where personal identity information is required (e.g. airline tickets). The system then instructs a controlled use card issuer (CUCI) to create and issue the controlled use card (CUC) which may be a purchase-specific single-use card or a multiple-use stored value card obtained through a credit card association. The CUC request is routed to a credit card issuer for approval. When the CUC issuer receives the approval, the CUC issuer assigns a CUC number, taken from a BIN of numbers previously allocated by the Credit Card association/Card Issuer, for attachment to the CUC. This becomes the member's CUC number. The CUC is completely anonymous with respect to user (member) identity and has no traceable connection to any other financial account. The approved CUC number is sent to the system software application, which completes an online checkout screen entering the CUC number into the credit card field and, for totally anonymous purchases, the software application also enters the CUC number into the shipping address field. The merchant receives the completed checkout screen and advises the member that the purchase is complete. The purchased goods (i.e. package) are labeled by a shipper without revealing the purchaser's (i.e. Member's) personal identity information to the Merchant. The package is then shipped and delivered to the appropriate shipping address. In all instances, the ID protection system does not require the member to communicate any differently with a selected merchant website, and yet the ID protection system provides maximum anonymity throughout the purchasing process.

Members are provided with an Anonymous Card Present (ACP) Card that is tied to an Anonymous Offline Purchase Account (ACP account) for use when making an offline (card present) purchase at any Merchant location that has PIN (Personal Identification Number) entry capability, such as at retail stores (e.g. grocery stores, drug stores, clothing stores, etc.). The Anonymous Offline Purchase Account is set up by the member and maintained by the system. The Member can fund this account to a specified dollar amount using any conventional funding source including all major credit cards. The physical ACP card provided to the Member does not provide a visible card holder name, account number or expiration date, nor does the ACP card require Members to provided an authorizing signature at the time of purchase. Members have the ability to specify the credit value of the ACP card, thereby limiting transactions only up to a card holder designated maximum dollar amount. Members can use the ACP card to make fully anonymous purchases, up to the stored value amount, without signing for the transaction.

A Member making a "card present" purchase submits the ACP card to the cashier (or directly to a credit card scanning device) in the conventional manner as is normally done with the use of a credit card or debit card. The Member enters his/her Identity Protection System PIN, known only to the Member, thereby authorizing the transaction process to begin. The transaction can only be approved if the correct PIN is entered and the ACP card has a stored value amount equal to or greater than the purchase amount. Accordingly, the ACP card is of no value to a criminal or other person in the event the card is stolen or lost.

BRIEF DESCRIPTION OF THE DRAWINGS

For a fuller understanding of the nature of the present invention, reference should be made to the following detailed description taken in conjunction with the accompanying drawings in which:

FIG. 5 is a schematic diagram illustrating a sequence of operation performed by the system to handle Customer/Member service issues between a Member and an online Merchant.

Like reference numerals refer to like parts throughout the several views of the drawings.

DETAILED DESCRIPTION OF THE PREFERRED EMBODIMENTS

Figure 1:
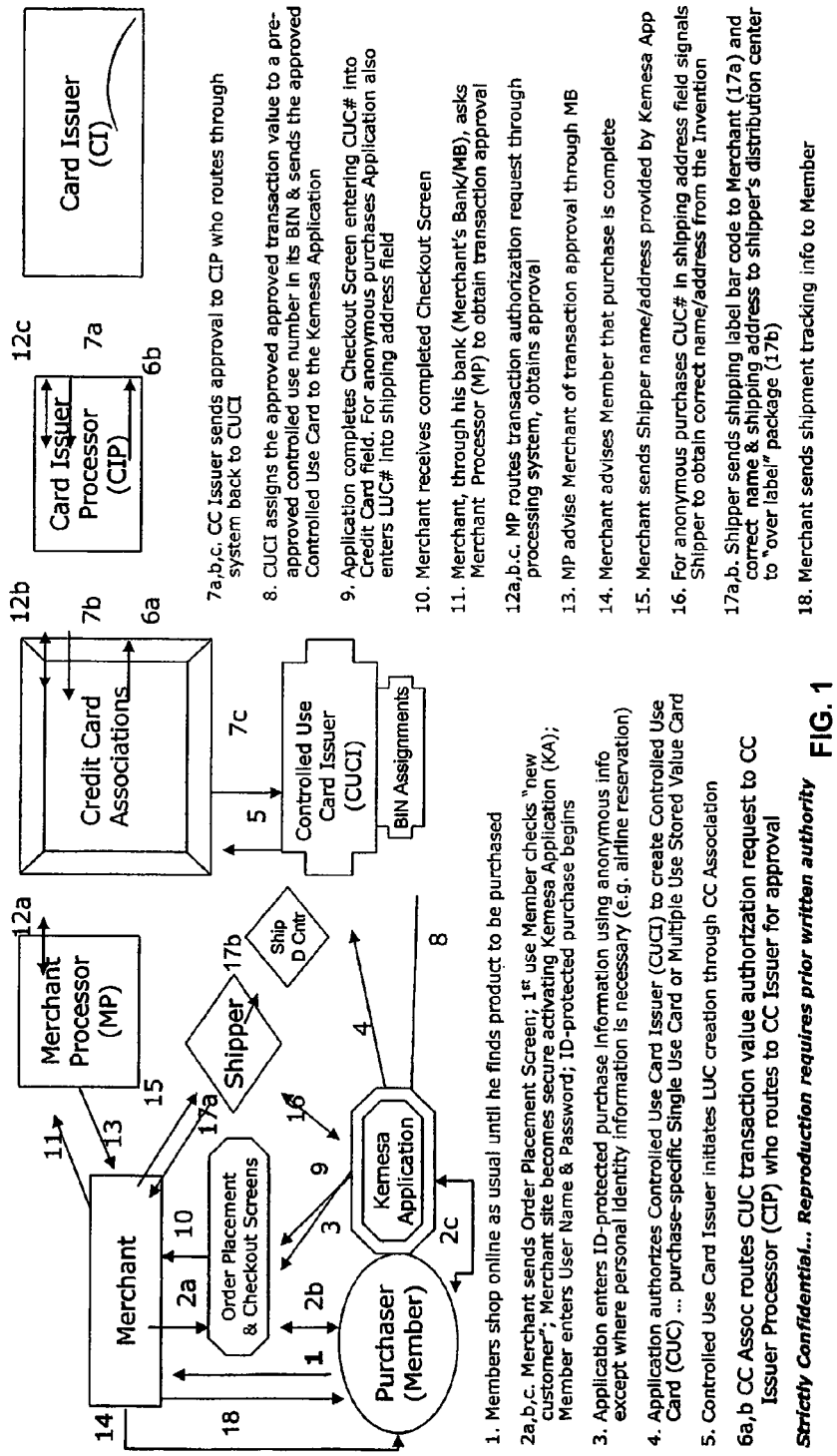
FIG. 1 is a schematic diagram illustrating a sequence of authorization operation of the personal identity theft protection system and method throughout an online ("card-not-present") purchase transaction in accordance with a preferred embodiment.
Figure 2:
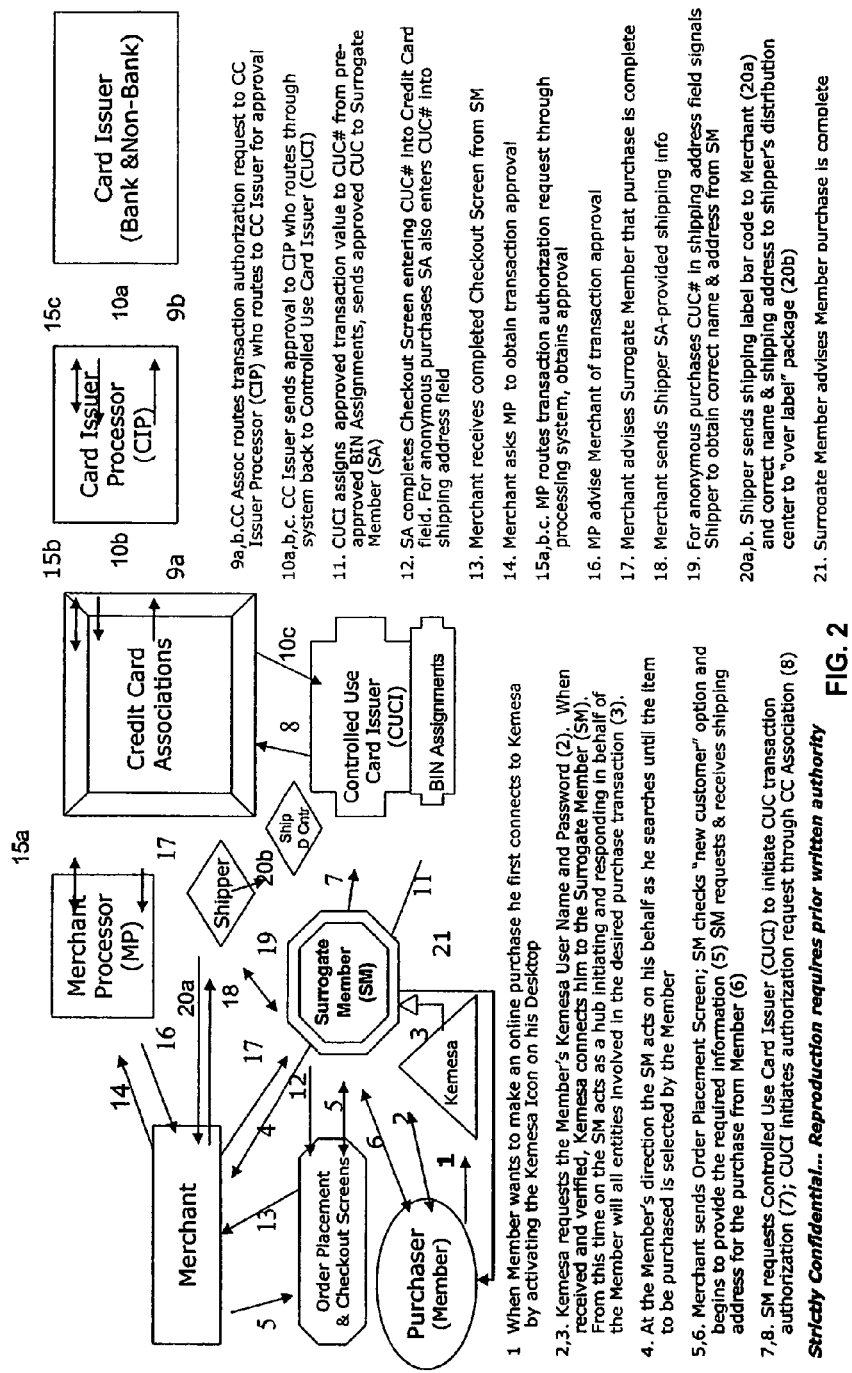
FIG. 2 is a schematic diagram illustrating a sequence of authorization operation of the personal identity theft protection system and method throughout an online ("card-not-present") purchase transaction, wherein a Surrogate member acts on behalf of the member as a secured purchase hub, in accordance with an alternative embodiment of the invention.
Figure 3:
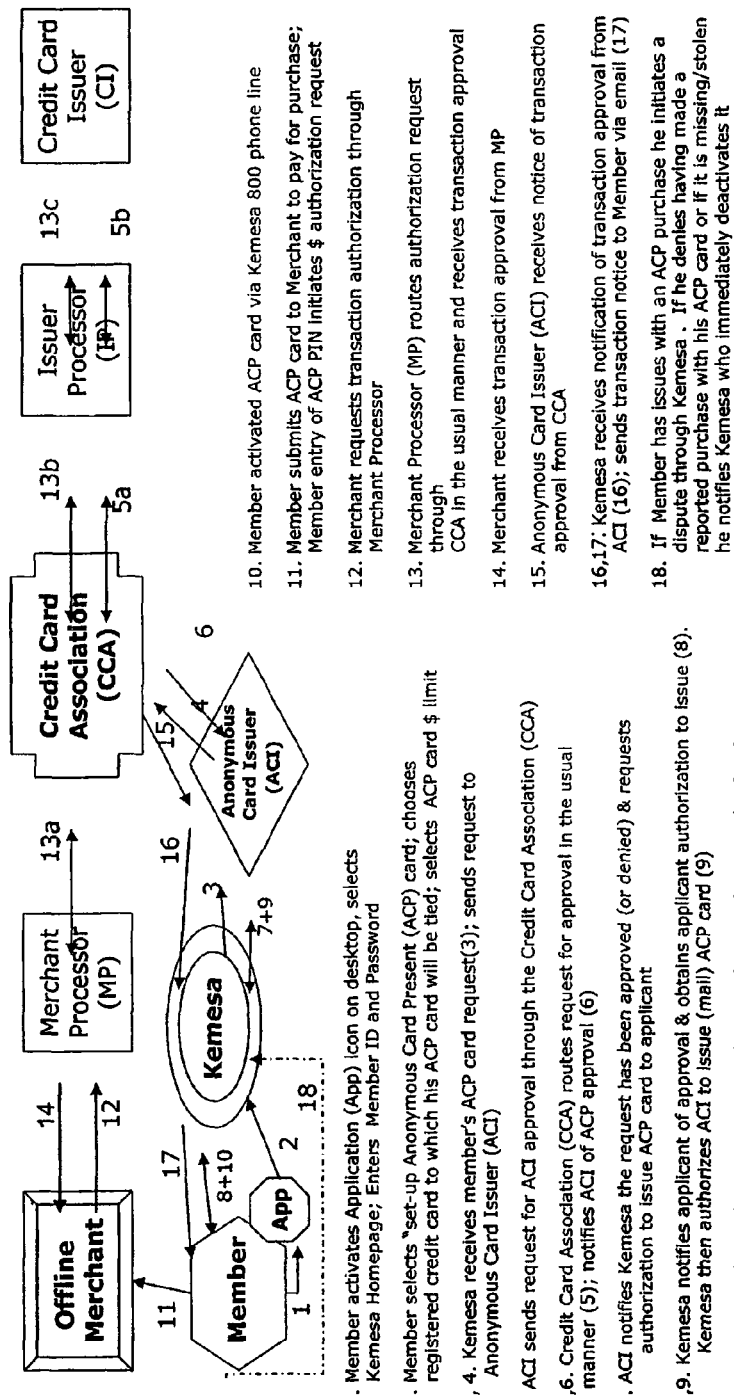
FIG. 3 is a schematic diagram illustrating a sequence of operation of the personal identity theft protection system and method for conducting offline (card-present) purchase transactions, in accordance with a preferred embodiment thereof.

The invention provides a system and method for preventing personal identity theft when making purchase transactions. The system and method operate to prevent theft of personal identity when conducting online purchase transactions, such as on the Internet, as shown in the embodiments of FIGS. 1 and 2. A further embodiment of the invention provides for protection against theft of personal identity when making offline purchase transactions, such as when purchasing goods at a retail store or services, as schematically shown in FIG. 3. Throughout the description which follows, the invention is also referred to as the "Identity Protection System" or the "System".

Online (Card-Not-Present) Purchase Transactions

Referring initially to FIG. 1, a primary embodiment of the invention is shown, wherein identity theft protection is provided during online purchase transactions. A purchaser desiring to use the Identity Protection System to make secure, identity protected purchases via a computer or other electronic device connected to a global computer network, such as the Internet, must first subscribe and become a Member user of the Identity Protection System by registering online or over the telephone. When registering, the applying Member must provide relevant personal identity information to the Identity Protection System which includes, but is not limited to, the person's name, billing address, email address, shipping address, telephone number and credit card account information. Once registered, the new Member is assigned a user name and password. The Identity Protection System secures the member's personal identity information and stores this information at one or more highly secure data storage locations. In a preferred embodiment, all personal identity information of Members is encrypted using 18-bit SSL encryption for storage at the one or more locations. In a further embodiment, the information is stored in multi-layered encryption for added security. The System may also fragment the encrypted information data prior to storage at multiple locations to further enhance security. Thus, even in the highly unlikely event a piece of encrypted and fragmented data is wrongfully acquired and decrypted, it would be of no meaningful use to a thief.

Referring now to FIG. 1, the Identity Protection System is used to provide personal identity protection during online purchase transactions conducted by the Member. The steps carried out by the system and method of the invention, as depicted in FIG. 1, are indicated by arrows and identified with reference numerals. To begin, at step 1, a member who has registered for the Identity Protection System of the invention, and has downloaded the system software application (hereafter also referred to as the "system application") onto the Member's personal computer in its default setting or has chosen to use the system by selecting the system icon on his desktop, is at a Merchant's website ready to make a purchase.

Once the Member has selected the purchase item(s), the Merchant activates an order placement screen (see step 2a) which asks whether the member is a new or returning customer of the Merchant website. In all cases, Members of the Identity Protection System will be instructed to check or click on the "new customer" option during their first use of the Identity Protection System at any Merchant website. In the preferred embodiment, the Member will always select the "new customer" option in order to achieve maximum anonymity and personal identity protection with each transaction. This serves to eliminate the possibility of any connection with a Member's real personal identity information the Merchant may have on file from prior visits by the Member to that Merchant's website. When the Member clicks "new customer", indicated by 2b or, in an alternative embodiment, has the system indicate that he is a returning customer, the next order placement screen issued by the Merchant normally becomes secure. This automatically activates the system software application. The system application then requests the Member to provide his user name and password in order to begin the ID-protected purchase, (indicated by 2c in FIG. 1). From this point forward, all purchases at that particular Merchant website will be conducted with the use of the Identity Protection System of the present invention, wherein maximum member anonymity is provided throughout the purchase process.

As an added level of security, the Identity Protection System provides virtual passwords unique to each Merchant and, in the preferred embodiment, unique to each transaction. This is achieved by the System assigning Merchant, and preferably transaction specific, passwords that are virtual (unknown) to even the Member. However, these Merchant or transaction specific passwords, although virtual to Members, will always be conveniently accessible to Members through the use of their unique, single-system password which was chosen by the Member at the time of registration. The use of virtual passwords provides an added level of security because, if stolen, a virtual password is at best useful only for fraudulent transaction with a single Merchant. However, in the preferred embodiment, wherein virtual passwords are used for each transaction, the virtual password is of no value if stolen. The transaction-specific virtual password is unique to a transaction that has been completed. Thus, a transaction-specific virtual password, once used by the Member, is of no use because it will not be accepted by any Merchant for any transaction in the future.

Next, the system software application proceeds to automatically fill in the new customer information on the order placement screen, as requested by the Merchant. The Member chooses whether to provide his/her real personal identity information or anonymous personal identity information, and instructs the system software application accordingly. This may occur as a result of a prompt by the system software application to the Member, requesting confirmation as to whether the information provided to the Merchant should be real (actual) personal identity information or anonymous information. If the Member indicates that the personal identity information should be anonymous, the Member is asked again by the system application to confirm this selection and indicate whether to provide maximum or totally anonymous personal identity information. This confirmation request allows the Member to take into consideration whether there is a need to know actual personal identity information in order to complete the transaction, such as in the purchase of airline tickets. In the preferred embodiment, the Member simply chooses whether the personal identity information should be anonymous or not, and the system software application is programmed to deny use of anonymous identity to ensure compliance with federal and state regulations, or other laws pertaining to the purchase. Irrespective of the level of anonymity, the Systems is always able to determine the Member's personal identity. This may be important for Homeland Security concerns and other security issues that require Member identification.

In a preferred embodiment, the Identity Protection System replaces the Member's telephone number(s) with number(s) that connect only to the Identity Protection System's Contact Center. In the event a Merchant calls this number(s), the Merchant will be placed in contact with a System representative at the Contact Center who is able to identify the Member being called. The representative may contact the Member if necessary. The System representative, therefore, is able to respond appropriately to the Merchant on the Member's behalf, determine whether the Member needs to be contacted and have the contact information available if it is necessary to do so.

The Member provides the system application with instructions as to which registered credit card account he/she wishes to use, the level of fraud protection desired for the purchase (e.g. entirely anonymous, real name only, full personal identity information, etc.), the merchant's name, and the amount of the purchase. The system application then instructs (indicated as step 4) a Controlled Use Card Issuer (CUCI) to acquire a Controlled Use Card Number having an anonymous identity and limited value with no traceable connection to any other financial account. The Member is then given a choice of the type of Controlled Use Card (CUC) to be used for the purchase. The CUC may be a one-time use card for the exact purchase amount or a stored value card for a specific dollar amount that is greater in value than the purchase cost of the present transaction. The stored value card allows for multiple purchases during the same session or future dates. The Member may chose to acquire a new stored value card or use an existing stored value card that has a sufficient balance remaining to pay for the cost of the presently conducted purchase transaction. If the Member chooses a one-time CUC card, it will be usable only by the specified Merchant for the date and time of the present purchase transaction. Thereafter, the assigned CUC number is deactivated and is of no value.

The Controlled Use Card Issuer then initiates the creation of the CUC with an associated CUC number and assigned value by following established credit card processing protocols. Specifically, the CUCI communicates with a Credit Card Association (indicated as step number 5) to request approval of the transaction associated with the CUC. The Credit Card Association then communicates with a Card Issuer Processor (as indicated at step 6*a*). The Card Issuer Processor in turn communicates with a Card Issuer (see 6*b*) for approval of the transaction having an attached dollar value credit amount. Once approved, the Card Issuer sends the approved transaction to the Card Issuer Processor (see 7*a*), which in turn routes the approval through the Credit Card Association (7*b*) and back to the Controlled Use Card Issuer (7*c*). The Controlled Use Card Issuer ("CUCI") then assigns a number to the approved CUC, selected from a Bin of pre-assigned numbers, and sends the specific Member-selected Controlled Use Card details (including the CUC number) to the system application residing on the Member's computer (indicated as step 8). The system application is now ready to fill in the correct CUC number and the remaining information required to the Merchant's checkout screen. In an alternative embodiment, the CUC simply issues the CUC and the Merchant requests approval in the same way he would for any credit card transaction.

When the system application receives the Controlled Use Card, the Member is then asked to again enter his/her user name, password, and confirmation of the amount to be paid for the purchase. This is done before the application enters the final information into the Merchant's order placement checkout screen. This serves as a further verification that the Member is making the purchase and that the amount to be paid to the Merchant is correct. In a preferred embodiment, the System employs a non-repudiation feature as an added measure of security. This is a digital (i.e. electronic) signature that uses a time-stamped electronic audit trail for authenticating member identity. This provides undeniable evidence that a transaction occurred and identifies the person who conducted the transaction. Once this information has been received from the Member, a purchase-specific payment number (and the CUC number for that transaction) is issued and a transaction number is assigned by the Identity Protection System. The purchase-specific payment number serves as the credit card number for that purchase. For anonymous purchases, the purchase-specific payment number also serves as the tracking device for converting the anonymous shipping address to the Member's real address if shipment is to be made by the Member. The Identity Protection System now proceeds to automatically complete the Merchant's checkout screen, providing only information that is anonymous with respect to the Member (in the case of a fully anonymous purchase), and only the real personal identity information that the Merchant needs to know in the case of the non-anonymous purchase (e.g. for airline tickets: passenger name, purchaser's ticket receiving address).

In all purchase transactions, the Member's real credit card information is not revealed and the transaction is made with a controlled use card. In the case of a fully anonymous purchase, the anonymous entries will vary depending on the Merchant's "need to know" certain information but, in addition to payment information, will usually include an anonymous, but system-linked "fictitious" name, a fictitious email address and any other required information, including a fictitious shipping address. From the Member's perspective, as well as the Merchant's perspective, the purchase transaction appears as any conventional online purchase transaction.

In one embodiment of the invention, when an anonymous (fictitious) shipping address is entered into the shipping address field, the system application will include all or part of the Controlled Use Card number entered as part of the anonymous shipping address. This will later serve as a signal to the Shipping Company (selected by the Merchant) that it needs to verify the correct shipping address with the Identity Protection System before issuing a shipping bar code to the Merchant's distribution center/agent (described further below in connection with steps 15-17). The completed checkout screen is now ready to be sent to the Merchant for order processing. It should be noted that when the Member's encrypted personal identity information is required for the purchase transaction, the Identity Protection System retrieves the Member's personal identity information from the highly secured data storage location(s) and decrypts the information only for the limited time and use necessary for the transaction. In one embodiment, wherein Members' personal identity information is encrypted and fragmented, the System assembles the randomly fragmented personal identity information data, using encrypted code techniques, and only for the limited time needed for the transaction. Additionally, almost all Merchants on the Internet provide anti-fraud measures to protect the transmission of the information during the time of transmission. If fragmenting is used, according to one embodiment of the invention, defragmentation of a Member's personal identity information is accomplished by a code matching process that brings together otherwise useless randomized fragments which are kept encrypted at multiple locations (preferably at least three separate locations). Only when the randomized fragments are correctly defragmented and connected in a secure encrypted environment, for the brief moment necessary to complete the transaction, do they provide meaningful personal identity information. In any case, the Identity Protection System's architecture does not allow a Member's personal identity information to be stolen from a Merchant's or other third party central database, thereby precluding exposure to the majority of identity theft situations.

Upon receipt of the completed checkout screen (see step 10), the Merchant processes the order following established protocols. Processing proceeds as it normally would in any online purchase transaction. The Merchant sends a transaction authorization request to the Merchant Processor (indicated as step 11). This request is then routed through the established processing system, initially to the Credit Card Association, then to the Card Issuer Processor and the Card Issuer. The Card Issuer approves (or denies) the transaction. The transaction approval/denial is then routed back to the Card Issuer Processor, the Credit Card Association and finally back to the Merchant Processor (indicated at steps 12*a*, 12*b*, 12*c*). The Merchant Processor then notifies the Merchant that the transaction has been approved (see step 13). The Merchant then notifies the Member (step 14) that the transaction has been approved, processed and completed.

Once the Merchant is notified that the transaction has been approved, the Merchant releases shipping instructions to a designated Shipper (indicated as step 15). In one embodiment, wherein the purchase is made as an anonymous purchase, the system application enters the Controlled Use Card Number into the shipping address field of the Merchant's checkout screen. [It should be noted that in this embodiment, all major Shippers will be provided with a special reading device to detect the Controlled Use Card Number when it appears in the shipping address field]. The special reading device provided to the Shipper will identify this now inactive Controlled Use Card Number in the shipping address field and, when detected, the Shipper is routed, via the special reading device, to the Identity Protection System. The Identity Protection System then translates the Controlled Use Card Number into the Member's correct/real shipping address and provides the Member's real shipping address to the Shipper (indicated as step 16). The Shipper then electronically transmits a scannable shipping label bar code to the Merchant and the correct (real/actual) shipping address to the Shipper's distribution center. The distribution center prints the shipping label and "over-labels" the package. It should be noted that only the Shipper obtains the Member's correct name and address, and not the Merchant. The Member's real name and address is never entered into the Merchant's primary database and is never identified, recognized, or made known to the Merchant.

The package is first transported from the Merchant to the Shipper's distribution center. At that time, the packaged is "over-labeled" with the Member's real name and shipping address, or other person and address specified by the Member. The Shipper's delivery vehicle picks up the package containing the purchased item(s) of the Member from the Shipper's distribution center for delivery to the Member or other address provided by the Member. At this stage, and up until delivery of the item(s), the Merchant sends shipment tracking information to the Member using the anonymous email address provided by the Identity Protection System when completing the order placement checkout screen. The system software application converts the anonymous email address to the Meniber's actual email address so that the Member receives the email tracking information from the Merchant. In an alternative embodiment, the System offers a Premium Service option that takes responsibility for tracking as well as other service dimensions like full customer service for any disputes with Merchants or Shippers.

Alternatively, if a Member has not chosen the System Application default setting during the registration process and decides to make an online purchase using the Identity Protection System of the present invention, the Member may select the Identity Protection System Icon installed on the Member's desktop after registration. Upon clicking on the system icon, the Member is prompted to enter his/her user ID and password. Once this has been done, all other steps, as described above, remain the same.

In the instance the Member is located away from his/her Home PC, and the Member wishes to make a purchase on the Internet using the Identity Protection System, the Member may go to the Identity Protection System website. At the System's website, the Member is prompted to enter his/her user name and password. This enables the Member to access his/her account from the System website and proceed to use the Identity Protection System from any computer, proceeding through the purchase transaction in the same manner as the Member would from his/her Home PC. All other steps performed in the purchase transaction are identical as described above in connection with FIG. 1.

Referring now to FIG. 2, an alternative embodiment of the online product purchase transaction process of the Identity Protection System is shown schematically. In this embodiment, the Identity Protection System acts on behalf of the Member from a completely separate Internet address/location (hereinafter also referred to as "Surrogate Member"). According to this embodiment, the Member first downloads software that allows the Member to connect to a Surrogate Member online when making purchases. Thereafter, the Member simply communicates with Merchants and other online purchase sites exclusively through the Surrogate Member. Merchants and all other parties involved in the purchase also communicate exclusively through the Surrogate Member throughout the purchase transaction. In this embodiment, the Surrogate Member may be a server on the Internet, acting as a "secure purchase hub" through which all purchase-related communications with the Member are directed in order to maintain Member anonymity and personal identity security. Just as in the primary embodiment of FIG. 1, the Member, acting through the Surrogate Member, is not required to communicate any differently with a selected Merchant website than is done during a conventional online purchase transaction.

In the online purchase transaction according to the embodiment of FIG. 2, the Member initially connects to the Identity Protection System by clicking on the System's icon on the Member's computer (indicated as step 1 in FIG. 2). Next, the Identity Protection System requests the Member's user name and password (indicated as step 2). Once the user name and password are received and verified, the Identity Protection System connects the Member to the Surrogate Member (see step 3). From this point forward, the Surrogate Member acts as a hub, initiating and responding on behalf of the Member with all entities involved in the desired purchase transaction.

At the Member's direction, the Surrogate Member acts on the Member's behalf as the Member searches the Internet until the desired item(s) to be purchased is selected by the Member (indicated as step 4). The Merchant then sends the order placement screen (see step 5) and the Surrogate Member checks the "new customer" option. Next, the Surrogate Member begins to provide all of the required information (see step 5*a*) in the order placement screen of the Merchant. The Surrogate Member then requests and receives the shipping address from the Member (see step 6). This is the address to which the Member desires the purchased item to be shipped. This address may or may not be the Member's address. For example, the Member may be purchasing an item to be shipped as a gift to another person, such as a friend or relative.

Next, the Surrogate Member requests the Controlled Use Card Issuer to initiate creation of the Controlled Use Card (see step 7). The Controlled Use Card Issuer then requests transaction authorization through the Credit Card Association (see step 8). Similar to the embodiment described in connection with FIG. 1, the Credit Card Association then routes the authorization request to the Credit Card Issuer Processor (9*a*) from which the request is further routed to the Credit Card Issuer (see step 9*b*) for approval. The Credit Card Issuer than sends approval of the transaction to the Card Issuer Processor (step 10*a*). The Card Issuer Processor then routes the approval through the Credit Card Association (step 10*b*) and to the Controlled Use Card Issuer (step 10*c*). The Controlled Use Card Issuer then assigns a number to the CUC, selected from a BIN of numbers, and sends the approved Controlled Use Card number to the Surrogate Member (see step 11). In an alternative embodiment, the Controlled Use Card Issuer simply issues the CUC number. The Merchant then requests transaction authorization as with a conventional credit card.

The Surrogate Member completes the Merchant's checkout screen, entering the Controlled Use Card number into the credit card field on the checkout screen. For anonymous purchases, the Surrogate Member also enters the Controlled Use Card number into the shipping field address on the Merchant's checkout screen (see step 12). The Merchant than receives the completed checkout screen from the Surrogate Member (step 13).

The Merchant asks the Merchant processor to obtain transaction approval (step 14). In the same manner as described in connection with the primary embodiment of FIG. 1, the approval request is routed through the Credit Card Association and Card Issuer Processor to the Card Issuer (steps 15*a*-*c*). The Card Issuer then approves (or denies) the request and routes the approval/denial back to the Merchant processor (steps 15*a*-15*c*).

The Merchant processor then advises the Merchant of transaction approval, (indicated as step 16). The Merchant then advises the Surrogate Member that the purchase is complete (see step 17).

Next, the Merchant sends the Shipper all shipping information which was previously provided by the Surrogate Member (see step 18). For anonymous purchases, the Controlled Use Card number in the shipping address field signals the Shipper to obtain the correct name and address from the Surrogate Member (see step 19). The shipper then sends the correct name and shipping address to the Merchant's distribution center for printing on a bar-coded shipping label (see step 20). The Surrogate Member then advises the Member that the purchase is complete (step 21).

Figure 4:
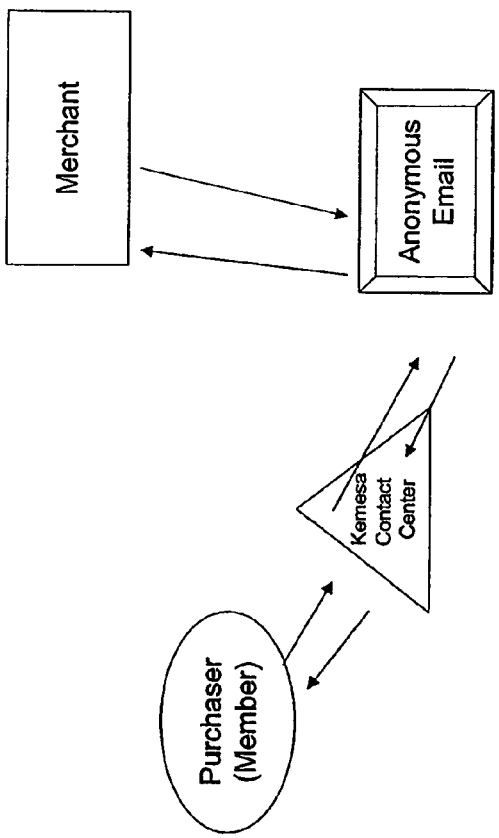
FIG. 4 is a schematic diagram illustrating a sequence of operation of anonymous email communication between a Purchaser/Member of the personal identity theft protection system and online Merchant.

Referring to FIG. 4, a schematic diagram illustrates communication between a Merchant and Member using an anonymous email feature of the Identity Protection System.

As noted above, when the Member conducts a purchase transaction with an online Merchant, the Identity Protection System provides anonymous information to the Merchant. This anonymous information includes an anonymous email address so that the Member's real (actual) email address is never revealed to the Merchant. Subsequently, if the Merchant attempts to contact the Member, using the anonymous email address provided to the Merchant by the Identity Protection System, the Merchant's email message is forwarded to the Identity Protection System Contact Center for handling. As shown in FIG. 4, the System Contact Center may forward the email message onto the Member. If the member opted to accept such emails at the time of registration with the System, the Member will receive the forwarded email. Next, the Member may respond to the Merchant's email message and send a reply email which is routed through the System Contact Center to the Member's anonymous email. The anonymous email then sends a message to the Merchant containing the Member's reply.

Referring now to FIG. 5, a schematic diagram is shown to illustrate a typical customer service process of the Identity Protection System for use in online (card-not-present) transactions. Because contact with Merchants in the online version of the System will in most cases be through anonymous email addresses and anonymous phone numbers, varying levels of customer service are needed. The level of customer service provided to a Member will be decided by each Member and may range from basic (e.g. Member handles all Merchant contact directly by accessing his/her anonymous email address and using the anonymous email to communicate with the Merchant) to advance customer service (e.g. all Merchant communication is routed and coordinated through the System Contact Center).

Because the customer service level is determined by the Member, and some Members will choose the advance option, the System provides a broad range of both Merchant and Member selected customer service capabilities. This includes contact and handling capabilities with Merchants, Shippers, Controlled Used Credit Card Issuers, and the Members themselves. Customer service capabilities include, but are not limited to: Purchase responsibility denial; billing disputes; returns; delivery failures; Member help; and account theft and fraud claims. Although most of these services are focused on the online version, some of these customer service capabilities also extend to the offline version (e.g. billing dispute, Member help, lost or stolen cards).

As seen in FIG. 5, a customer service process between the Purchaser/Member and the Merchant involves communication through the System Contact Center. In this example, a Member with a Merchant issue (e.g. return of a purchased item) activates the System application software on his/her computer. The Member selects the free "customer service" option by clicking on the appropriate icon. Alternatively, the Member may use a direct dial telephone option which may require payment of a fee. Next, in step 2, the software application connects with the System Contact Center which addresses specifics of a Merchant issue. The System Contact Center then activates the anonymous email (see step 3) which is on file with the particular Merchant. The System Contact Center composes an email message incorporating the Member's request of the Merchant (e.g. to return the purchased item for a refund). Next, in step 4, the anonymous email is sent to the Merchant. The anonymous email references the order details (e.g. invoice number) along with the specific Member request. In step 5, the Merchant responds to the Member request and sends the reply to the anonymous email. The System Contact Center then receives the Merchant's email (see step 6) and sends the Merchant's email reply to the system software application residing on the Member's computer (see step 7). The system software application presents the Merchant's email reply to the Member (see step 8). In the event the Member is not satisfied with the Merchant's response, the Member can contact the System Contact Center directly, indicated as step 9, to provide further action direction until a satisfactory resolution is achieved. When a resolution is achieved, the System Contact Center communicates with the Control Card Issuer if payment adjustment is required (see step 10*b*). If needed, the System Contact Center also contacts the Merchant on behalf of the Member (see step 10*a*). Finally, in step 11, the System Contact Center provides the Member with details of all actions taken and a summary of any applicable service fees charged.

In addition to the online purchase features described above in connection with the embodiments of FIGS. 1 and 2, the Identity Protection System of the present invention provides the following additional benefits and features:

UNIVERSAL ACCESS TO THE PERSONAL IDENTIFICATION PROTECTION SYSTEM BY ALL MAJOR CREDIT CARDS

Members may register their anonymous online purchasing accounts with any one or more major credit cards that have an active account in good standing. Once registered, each time the Member initiates a purchase using the Identification Protection System, he/she may choose any previously registered credit card accounts and proceed directly with an anonymous purchase without visiting additional websites or performing any additional steps.

UNLIMITED ACCOUNT ACCESS BY MEMBERS

The Identification Protection System of the present invention may be accessed by Members from any computer that provides a private environment. Members simply activate their accounts through the Identity Protection System's website by entering their Member user name and password. This enables Members to make anonymous online purchases just as they would from their Home PC or primary computer. When the Member uses the Identity Protection System away from his/her Home PC, the online purchase transaction is made from the System website. There is no downloading to a satellite computer. However, a detailed record of website-originated anonymous purchases (as well as all other purchases using the Identity Protection system) will appear in the Member's electronic account history.

HIGHLY SECURE MEMBER REGISTRATION

When Members first register with the Identity Protection System from the System's website, they are given the option of registering either online using 128-bit SSL encryption or offline (i.e. by telephone or mail).

In an alternative embodiment, even if Members choose to register online, their credit card information will only be communicated to the Identity Protection System via secure non-Internet transmission channels that provide higher levels of security. This prevents the Identity Protection System from ever receiving the Member's real credit card accounts online, thereby precluding any chance of online credit card theft during the registration process.

HANDLING OF MERCHANT EMAILS SUBSEQUENT TO ANONYMOUS PURCHASES

In the embodiment of FIG. 2, the use of a Surrogate Member provides Members with the ability to control receipt of Merchant offers, thereby reducing the incidence of unwanted emails. When a Member first registers to become a member and use the Identity Protection System of the present invention, the Member will be asked if he/she wants to receive Merchant offers by email, as commonly done by online Merchants following a purchase in order to advise the customer of attractive discounts, sales, new products, etc. Members are provided with a choice when registering to "always" see Merchant follow-up emails, "occasionally" receive such emails, or "never" receive such emails. If the member indicates "never", the Surrogate Member will decline receipt of such offers. If the member indicates "always", the Surrogate Member will always pass along such offers to the Member. Moreover, if the Member indicates "occasionally", the Surrogate Member will ask the member for a "yes/no" indication each time he contemplates a purchase using the Identity Protection System.

SPECIAL MERCHANT OFFERS TO PURCHASING MEMBERS

When Members first register for the invention, they will be asked if they would like to receive special offers not generally made available by Merchants either generally or limited to a Member-designated list of Merchants. The Identity Protection System will then invite those Merchants to make such special offers to these high potential customer prospects without compromising their anonymity.

ONGOING ACCOUNT HISTORY

The Identity Protection System will provide each Member with the ability to review the details of all purchases made using the invention. This is achieved in two ways: (1) by electronically sending Members a monthly statement of activities; and (2) by providing Members with the ability to electronically access their account history on the Identity Protection System's website. While the Members' purchases are paid through the Members' major credit card accounts, their credit card account statements will not provide such detail as to the purchases made using the Identity Protection System. Instead, Members' credit card statements will only indicate the date, amount of purchase and that the purchase was made using the Identity Protection System. Accordingly, this feature allows Members to view details of all purchases made using the Identity Protection System of the present invention, in order to confirm authorized purchases and to reconcile their accounts.

SYSTEM ACCOUNT SHARING

When Members first register to use the Identity Protection System, they will be given the option of allowing other designated individuals ("Associates") permission to use their account. They may also designate a monthly dollar amount purchase limit for each Associate. In any case, a different Password will be assigned to each Associate. In addition, the purchase history for each Associate will be separately reported in the monthly statement and history.

DEDICATED SYSTEM ONLINE CREDIT CARD

At registration, Members will be asked whether they would like to apply for a special System credit card account as an alternative or in addition to use of other major credit card accounts they may choose to register. This System credit card account will be issued by one or more major Credit Card Issuers of Visa, MasterCard, Discover or American Express. The benefits of this special System credit card account are:

a. Account activity statements will provide the details of purchases made using the Identity Protection System that are not reported in the Members' regular credit card statements.
b. Using the System credit card allows Members to participate in lucrative "Purchase Discounts and Rewards" programs.
c. The special System credit card will be required for Members to participate in anonymous offline purchase capability (described below) which can be used with any retail Merchant having conventional credit card purchase processing equipment with PIN entry capability.

NON-REPUDIATION SECURITY FEATURE

As an added measure of security, the System protects Members from personal identity theft and also protects the System itself from fraudulent use of its services by incorporating a non-repudiation feature. This is a digital (i.e. electronic) signature that uses a time-stamped electronic audit trail for authenticating Member identity. This feature protects Members from personal identity theft because the digital signature can only be used by the Member. The digital signature is always unique to a single individual. Non-repudiation also guards against fraudulent use of the System by providing undeniable evidence that a transaction occurred and by identifying the person who conducted the transaction.

Offline (Card Present) Purchase Transactions

Referring now to FIG. 3, a schematic diagram is shown illustrating an offline purchase transaction in accordance with the Identity Protection System of the present invention. In this embodiment, a Member is provided with the ability to purchase products and services offline at any location that has PIN (Personal Identification Number) entry capability, such as at retail stores (e.g. grocery stores, drug stores, clothing stores, etc.) without revealing or compromising any Personal Identity Information. More particularly, the offline purchase feature of the Identity Protection System, as depicted in FIG. 3, allows the member to conduct a completely anonymous offline purchase transaction.

The previous embodiments described above, as shown in FIGS. 1 and 2, were directed to an online (e.g. Internet) purchasing environment. This particular embodiment of the invention, as shown in FIG. 3, is intended to provide an identity protected alternative which offers maximum anonymity to credit card use for purchases that are not made online. Conventional Credit Cards usually bear the card holder name, a credit card account number, expiration date and access to the entire credit line balance of a given credit card account. Because credit cards are the dominant means by which consumers, both individuals and businesses, pay for purchase transactions when conducting business with retail Merchants, there is a tremendous risk of credit card fraud and identity theft.

The offline purchase feature of the present invention, as described below, provides total purchase anonymity with the use of a physical card that is read by a conventional credit card reading device at a physical point of purchase. However, the physical card provided to the Member does not provide a visible card holder name, account number or expiration date (only accessible by highly sophisticated and secure decryption equipment), nor does this card require Members to provide an authorizing signature. Additionally, Members have the ability to specify the credit value of the card, thereby limiting transactions only up to a card holder designated maximum dollar amount. This provides a security feature by limiting credit line access. Moreover, unlike conventional credit cards, Members can use any credit card account to obtain the stored value assigned to the fully anonymous stored value card. Unlike some credit card purchases that do not require signature when the transaction is below a defined threshold (e.g. McDonald's, Burger King, Starbucks, etc.), the stored value card requires no signature regardless of the purchase transaction amount.

Referring now to FIG. 3, the sequence of operation of the offline purchase process of the present invention is shown schematically, wherein individual steps of the process are indicated by numbered arrows which correspond with a numbered step sequence.

To begin step 1, according to a preferred and primary embodiment, a Member of the Identity Protection System of the present invention, who has decided to apply for an offline purchasing option of the Identity Protection System, activates the System icon on the Members Home PC, selects the Identity Protection System homepage, and enters the Member's user number and password. This provides the Member with access to the various options available under the Identity Protection System of the present invention.

In an alternative embodiment, the Member (or non-member) may apply for an offline version of the Identity Protection System by dialing a toll-free telephone number. If the person is an online subscriber, the Member provides his/her user number and password. This helps to expedite the registration process for the offline purchase option using the Identity Protection System. If the person is not currently a member, he/she will need to apply as a first-time user of the System. As previously described in connection with the embodiments of FIGS. 1 and 2, any and all personal identity information provided during the registration process (e.g. name, address, assigned Member ID/user name and password, PIN, credit card account information, etc.), once recorded by the System, is 128-bit SSL encrypted and stored at one or more locations using sophisticated multi-layered encryption data storage technologies to prevent the possibility of identity theft from a central data storage location.

In still another embodiment of the offline purchase option, a Member or non-member may register for the offline purchase option by accessing the System's website. The remainder of the registration process is the same as described in the previous embodiments.

In step 2, as shown in FIG. 3, the Member, having signed in on the Identity Protection System's home page, selects the option for obtaining the offline purchase version of the Identity Protection System which will afford the Member the same complete anonymity when making offline purchases among all retailers that accept major credit cards. More specifically, the Member selects the option to set up an Anonymous Offline (Card Present) Purchase Account (ACP account) and issuance of an Anonymous Card Present (ACP) Card for that ACP account. The Member selects one of his already registered major credit card accounts to which his ACP account will be tied, the maximum dollar amount the ACP account will carry, and the account balance threshold level that will trigger a Member choice of either automatic replenishment or a replenishment request to the Member.

In an alternative embodiment of step 2, a Member may contact the System's toll-free number at any time and, after providing the Member's user name and password, the Member may request replenishment of his ACP account.

Next, in step 3, the Identity Protection System sends a 128-bit SSL encrypted request to an ACP Card Issuer requesting the creation of the ACP card that has been applied for by the Member.

In an alternative embodiment to step 3, the System's request to the ACP Card Issuer is transmitted over secure non-Internet transmission channels which provide even higher security levels. In either case, however, all ACP account requests are transmitted individually (never in batches), thereby further mitigating exposure to multiple Member identity theft.

In step 4, the ACP Card Issuer requests authorization from the designated Credit Card Association to issue the ACP card. Upon receipt of the authorization request, the Credit Card Association routes the authorization request as it normally would in any stored value card request. Accordingly, no change in established authorization procedure protocol is required. As indicated in steps 5a and 5b, the authorization requested is routed through the Issuer Processor to a Credit Card Issuer. When the Credit Card Association receives approval from the Credit Card Issuer, routed through the Issuer Processor, the Credit Card Association notifies the ACP Card Issuer, see step 6.

Next, in step 7, the ACP Card Issuer notifies the Identity Protection System that the ACP request has been approved and requests authorization to publish and send the ISO card to the Member/Applicant.

In step 8, the System notifies the Member/Applicant of the approval. The Identity Protection System also gives the Member/Applicant explicit details regarding the identification of the ACP Card mailing container/envelope to assure proper handling upon receipt.

In an alternative embodiment to step 8, the Identity Protection System requests a final authorization by the Member/Applicant to release (i.e. mail) the ISO card, thereby providing an additional confirmation measure.

In step 9, the Identity Protection System receives final applicant authorization and authorizes the ACP Card Issuer to release (i.e. mail) the ACP card to the Member/Applicant. Once again, the Member's/Applicant's personal identity information is retrieved and decrypted from the one or more locations only long enough to allow the ACP Card Issuer to print the mailing envelope containing the Member's/Applicant's ACP card, thereby providing additional protection against theft of identity information from a central data storage location.

In step 10, the Member/Applicant activates his ACP card by calling the Identity Protection System activation telephone number, providing his user name and PIN and describing ACP Card specific information included to assure Member authentication.

In step 11, a Member making a purchase from an offline Merchant/Retailer submits his ACP card to the cashier (or directly to a credit card scanning device) as any purchaser would with a conventional debit card. The Member enters his Identity Protection System PIN, known only to him, thereby authorizing the transaction process to begin. If this PIN is not correctly entered, the transaction is immediately rejected. Accordingly, the ACP card is of no value to a criminal or other person in the event the card is stolen or lost. This prevents unauthorized or fraudulent use of the ACP card.

In steps 12-14, the retailer's cashier (or credit card scanning device) processes the transaction authorization request in the same manner as a conventional major credit card. However, unlike a major conventional credit card transaction, the Identity Protection System provides the Member's signature electronically, without identifying the Member's name, thereby preserving complete purchase autonomy as well as total anonymity. The Merchant Processor then routes the authorization request through the appropriate Credit Card Association in the industry standard manner, see step 13.

Upon receipt of the transaction approval from the Credit Card Association, the Merchant Processor notifies the Merchant in the industry standard manner. On those rare occasions where some personal identity information is demanded by the Merchant/Retailer and the Member is willing to comply with the demand, the Member may manually provide such requested information (i.e. name, telephone number, address, etc). To provide maximum identity protection, all Members are instructed to comply with identity information requests only when the Merchant/Retailer has a genuine "need-to-know" the requested personal identity information. In all embodiments, Members are provided with a live "Purchase Assistance Help Line" (PAHL) to provide point-of-purchase assistance whenever assistance is needed to consummate purchases using the Member's ACP card with maximum purchase anonymity.

In step 15, the Credit Card Association notifies the ACP Card Issuer of the approved transaction concurrent with its notification to the Merchant Processor. Then, in steps 16 and 17, the ACP Card Issuer notifies the Identity Protection System of the approved transaction. The Identity Protection System immediately notifies Members who have chosen to register an email address, thereby providing a real time mechanism by which the Member can track their ACP card purchases and monitor their ACP account balance (step 17).

Step 18 provides a means for Members to dispute previous transactions wherein the ACP card was used. Specifically, a Member, upon notification of an approved transaction by the Identity Protection System, may not agree with the transaction and suspect fraud. In other instances, the Member may discover that his/her ACP card has been lost or stolen. In any of these situations, the Member may request the Identity Protection System to immediately deactivate the ACP card. Alternatively, the Member may simply initiate a dispute against the Merchant/Retailer to whom the transaction was credited (similar to a Merchant dispute involving a conventional credit card).

When a Member initiates a dispute with a Merchant/Retailer, the Identity Protection System routes the dispute to the ACP Card Issuer. The ACP Card Issuer then routes the dispute through the appropriate Credit Card Association for resolution following standard industry protocol procedures used in a conventional credit card transaction dispute. In the unlikely event of a fraudulent transaction attributable to theft of the ACP card, the Member is provided with full (100%) protection by the Identity Protection System against any financial loss or related personal liability. Accordingly, the Identity Protection System uniquely provides its Members with both purchase anonymity and virtually 100% protection against confirmed fraudulent transactions resulting from the theft and misuse of their ACP card.

A further embodiment of the system and method of the present invention provides protection against identity theft when Members of the Identity Protection System use online bill payment services provided by the Member's bank or other financial institution. In this embodiment, the Member instructs the financial institution to route all online bill payments through the Identity Protection System. Subsequently, the Identity Protection System receives all bill payment details, instructions and payment authorization from the Member's financial institution. Much like the previously described embodiment of FIG. 1, directed to online purchase transactions, the Identity Protection System shields the Member's personal identity information, including bank account and routing information, from all recipients of online bill payments. All payments made by the Identity Protection System, in the online payment of the Member's bills, are made as an untraceable, single-use payment. This untraceable, single-use payment is electronically routed to the appropriate bill payment recipient without revealing unnecessary personal identity information of the Member, including routing numbers, bank account numbers and other financial account information.

After the protected single-use payment is routed to the bill payment recipient, the recipient sends an acknowledgment of receipt of the online payment to the Identity Protection System, in the same manner the recipient would do after receiving payment from the Member's financial institution using conventional online bill payment services. Upon receipt of this payment confirmation, the Identity Protection System communicates the consummation of the online payment to the Member's financial institution. The financial institution then debits the bill payment to the Member's statement and reports account status to the Member in the usual manner.

Accordingly, this online bill payment system and method of the present invention removes all traceable identity of the bank (financial institution) routing and account identification information from online bill payment activities. In doing so, the Identity Protection System satisfies the Member's financial obligation without revealing any usable information that could subsequently be employed by payment recipients or third parties to conduct a fraudulent transaction involving the Member's financial account.

While the present invention has been shown and described in accordance with several preferred and practical embodiments thereof, it is recognized that departures from the instant disclosure are fully contemplated within the spirit and scope of the present invention which, therefore, is not to be limited except as defined in the following claims as interpreted under the doctrine of equivalents.

What is claimed is:

1. A method for protecting against theft of personal identity information during purchase transactions, said method comprising the steps of:
    registering an individual subscriber as a member of an identity protection system and obtaining personal identity information from the subscribing member, including the subscribing member's name and account information for at least one financial account of the subscribing member, the at least one financial account being preexisting to and independent of membership, and being issued by a credit issuer that is external to the identity protection system, the identity protection system further performing:
    receiving the personal identity information obtained from each subscribing member as storable computer data;
    encrypting the entered personal identity information data by a computer;
    fragmenting the encrypted data by a computer;
    storing portions of the fragmented encrypted data, by at least one computer, independently at separate computer data storage locations;
    preventing third party access to the fragmented encrypted data;
    allowing the subscribing member to conduct at least one purchase transaction with a merchant, and allowing the subscribing member to select the at least one financial account from which funds will be used for indirect payment of the purchase transaction;
    requesting credit authorization of the credit issuer for a monetary purchase value amount to be charged against the at least one financial account of the subscribing member;
    obtaining approval of the credit issuer for the monetary purchase value amount;
    assigning the monetary purchase value amount to a temporary card number selected from a plurality of pre-approved card numbers at the time of obtaining approval of the credit issuer for the purchase value amount of the purchase transaction, and assigning the card number to an anonymous card for exclusive use by the subscribing member to conduct the at least one purchase transaction with the merchant, the anonymous card having no traceable connection outside the identity protection system to any financial account of the subscribing member including the at least one financial account
    presenting the anonymous card to the merchant when the subscribing member is conducting a purchase transaction with the merchant; and
    allowing the merchant to obtain credit approval and payment for the purchase transaction against the anonymous card in an amount not exceeding the approved monetary purchase value amount and without revealing any personal identity information of the subscribing member.

2. The method as recited in claim 1 wherein said personal identity information obtained during said step of registering further includes a mailing address of the subscribing member.

3. The method as recited in claim 1 wherein said personal identity information obtained during said step of registering further includes a telephone number of the subscribing member.

4. The method as recited in claim 1 wherein said personal identity information obtained during said step of registering further includes an email address of the subscribing member.

5. The method as recited in claim 1 wherein said at least one financial account of the subscribing member is a credit card account.

6. The method as recited in claim 5 wherein said account information obtained during said step of registering includes a plurality of credit card accounts.

7. The method as recited in claim 5 wherein said step of requesting credit authorization for the monetary purchase value amount further comprises the step of:
    charging the monetary purchase value amount against the credit card account.

8. The method as recited in claim 1 wherein said monetary purchase value amount is selected by the member.

9. The method as recited in claim 1 wherein said purchase transaction is conducted between the subscribing member and the merchant via a global computer network and said anonymous card is virtual and is identified by an assigned temporary card number.

10. The method as recited in claim 9 further comprising the steps of:
    providing the subscribing member with a user name and password; and
    providing a software application for installation on a computer used by the subscribing member for allowing the computer to perform a portion of the method of claim 9.

11. The method as recited in claim 10 further comprising the steps of:
    allowing the subscribing member to shop on a global computer network using the subscribing member's computer having the software application installed therein;
    instructing the subscribing member to enter the subscribing member's user name and password when conducting the purchase transaction with the merchant via the global computer network; and entering anonymous information in an order placement screen of the merchant on behalf of the subscribing member to avoid revealing any unnecessary personal identity information of the subscribing member to the merchant.

12. The method as recited in claim 11 further comprising the steps of:
   establishing an anonymous email address on behalf of the subscribing member;
   providing the anonymous email address to the merchant;
   receiving email communications from the merchant at the anonymous email address;
   forwarding email communications from the merchant to the subscribing member at the subscribing member's real email address;
   receiving email communications from the subscribing member via the subscribing member's real email address; and
   forwarding email communications from the subscribing member to the merchant via the anonymous email address without ever revealing the subscribing member's real email address to the merchant.

13. The method as recited in claim 1 wherein the purchase transaction conducted between the subscribing member and the merchant is a card present transaction.

14. The method as recited in claim 13 further comprising the steps of:
   providing an anonymous card in physical form to the subscribing member for use in conducting one or more card present purchase transactions;
   assigning the authorized monetary purchase value amount to an anonymous account associated with the anonymous card;
   allowing the subscribing member to present the anonymous card to the merchant when conducting the card present purchase transaction without revealing the subscribing member's personal identity information to the merchant;
   allowing the merchant to obtain credit approval and payment for the card present purchase transaction up to the assigned monetary purchase value amount; and
   debiting the merchant payment against the anonymous account to reduce the assigned authorized monetary purchase value amount.

15. The method as recited in claim 1 wherein allowing the subscribing member to conduct the at least one purchase transaction with the merchant comprises providing a virtual password to the merchant, wherein the virtual password is unknown to the subscribing member.

16. The method as in claim 15 wherein the at least one purchase transaction is a single transaction, and wherein the virtual password is specific to the single transaction and the merchant, and cannot be used with a different transaction with the merchant.

17. A method for protecting against theft of personal identity information during purchase transactions, said method comprising the steps of:
   registering an individual subscriber as a member of an identity protection system and obtaining personal identity information from each individual member, including the subscribing member's name and account information for at least one financial account of the subscribing member, the at least one financial account being preexisting to and independent of membership, and being issued by a credit issuer that is external to the identity protection system, the identity protection system further performing:
   receiving the personal identity information obtained from each subscribing member as storable computer data;
   encrypting the entered personal identity information data by a computer;
   fragmenting the encrypted data by a computer;
   storing portions of the fragmented encrypted data, by at least one computer, independently at separate computer data storage locations;
   preventing third party access to the fragmented encrypted data;
   allowing the subscribing member to conduct at least one purchase transaction with a merchant, and allowing the subscribing member to select the at least one financial account from which funds will be used for indirect payment of the purchase transaction;
   requesting credit authorization of the credit issuer for a monetary purchase value amount to be charged against the at least one financial account of the subscribing member;
   obtaining approval of the credit issuer for the monetary purchase value amount and assigning the approved monetary purchase value amount to the issued anonymous controlled use card;
   assigning the monetary purchase value amount to a temporary controlled use card number selected from a plurality of pre-approved temporary controlled use card numbers at the time of obtaining approval of the credit issuer for the purchase value amount of the purchase transaction, and assigning the temporary controlled use card number to an anonymous controlled use card for exclusive use by the subscribing member to conduct the at least one purchase transaction with the merchant, the anonymous controlled use card having no traceable connection outside the identity protection system to any financial account of the subscribing member including the at least one financial account
   presenting the anonymous controlled use card number to the merchant when the subscribing member is conducting a purchase transaction with the merchant; and
   allowing the merchant to obtain credit approval and payment for the purchase transaction against the anonymous controlled use card in an amount not exceeding the approved monetary purchase value amount and without revealing any personal identity information of the subscribing member.

18. The method as recited in claim 17 wherein said personal identity information obtained during said step of registering further includes a mailing address of the subscribing member.

19. The method as recited in claim 17 wherein said personal identity information obtained during said step of registering further includes a telephone number of the subscribing member.

20. The method as recited in claim 17 wherein said personal identity information obtained during said step of registering further includes an email address of the subscribing member.

21. The method as recited in claim 17 wherein said at least one financial account of the subscribing member is a credit card account.

22. The method as recited in claim 21 wherein said account information obtained during said step of registering includes a plurality of credit card accounts.

23. The method as recited in claim 21 wherein said step of requesting credit authorization for the monetary purchase value amount further comprises the step of:

charging the monetary purchase value amount against the credit card account.

24. The method as recited in claim 17 wherein said monetary purchase value amount is selected by the member.

25. The method as recited in claim 17 wherein said purchase transaction is conducted between the subscribing member and the merchant via a global computer network.

26. The method as recited in claim 25 further comprising the steps of:
providing the prescribing member with a user name and password; and
providing a software application for installation on a computer used by the subscribing member for performing at least a portion of the method of claim 25 using the computer.

27. The method as recited in claim 26 further comprising the steps of:
allowing the subscribing member to shop on a global computer network using the subscribing member's computer having the software application installed therein;
instructing the subscribing member to enter the subscribing member's user name and password when conducting the purchase transaction with the merchant via the global computer network; and
entering anonymous information in an order placement screen of the merchant on behalf of the subscribing member to avoid revealing any unnecessary personal identity information of the subscribing member to the merchant.

28. The method as recited in claim 27 further comprising the steps of:
establishing an anonymous email address on behalf of the subscribing member;
providing the anonymous email address to the merchant;
receiving email communications from the merchant at the anonymous email address;
forwarding email communications from the merchant to the subscribing member at the subscribing member's real email address;
receiving email communications from the subscribing member via the subscribing member's real email address; and
forwarding email communications from the subscribing member to the merchant via the anonymous email address without ever revealing the subscribing member's real email address to the merchant.

29. The method as recited in claim 17 wherein allowing the subscribing member to conduct the at least one purchase transaction with the merchant comprises providing a virtual password to the merchant, wherein the virtual password is unknown to the subscribing member.

30. The method as in claim 29 wherein the at least one purchase transaction is a single transaction, and wherein the virtual password is specific to the single transaction and the merchant and cannot be used with a different transaction with the merchant.

31. A method for protecting against theft of personal identity information during purchase transactions, said method comprising the steps of:
registering an individual subscriber as a member of an identity protection system and obtaining personal identity information from the member, including the subscribing member's name and account information for at least one financial account of the subscribing member, the at least one financial account being preexisting to and independent of membership, and being issued by a credit issuer that is external to the identity protection system, the identity protection system further performing:
receiving the personal identity information obtained from each subscribing member as storable computer data;
encrypting the entered personal identity information data by a computer;
fragmenting the encrypted data by a computer;
storing portions of the fragmented encrypted data, by at least one computer, independently at separate computer data storage locations;
preventing third party access to the fragmented encrypted data;
issuing an anonymous controlled use card from a plurality of pre-approved anonymous controlled use cards on behalf of the subscribing member for exclusive use to conduct at least one purchase transaction with a specific merchant and issuing separate ones of said anonymous controlled use card, each for exclusive use to conduct at least one purchase transaction between the subscribing member and a different merchant, and each issued anonymous controlled use card having no traceable connection to any financial account of the subscribing member including the at least one financial account;
presenting the anonymous controlled use card number to a merchant when conducting a purchase transaction with a merchant;
requesting credit authorization of the credit issuer for a monetary purchase value amount of the purchase transaction to be charged against the at least one financial account of the subscribing member;
obtaining approval of the credit issuer for the monetary purchase value amount, and assigning the approved monetary purchase value amount to the issued anonymous controlled use card;
assigning a temporary controlled use card number to the issued anonymous controlled use card at the time of obtaining approval of the credit issuer for the monetary purchase value amount of the purchase transaction; and
sending an approval indication to the merchant acknowledging approval for the monetary purchase value amount of the purchase transaction without revealing any personal identity information of the member.

32. The method as recited in claim 31 wherein said at least one financial account of the subscribing member is a credit card account.

33. The method as recited in claim 31 wherein said account information obtained during said step of registering includes a plurality of credit card accounts.

34. The method as recited in claim 32 wherein said step of requesting credit authorization for the monetary purchase value amount further comprises the step of:
charging the monetary purchase value amount against the credit card account of the subscribing member.

35. The method as recited in claim 31 wherein said purchase transaction is conducted between the subscribing member and the merchant via a global computer network.

36. The method as recited in claim 35 further comprising the steps of:
providing the subscribing member with a user name and password; and
providing a software application for installation on a computer used by the subscribing member for performing at least a portion of the method of claim 35 using the computer.

37. The method as recited in claim 36 further comprising the steps of:

allowing the subscribing member to shop on a global computer network using the subscribing member's computer having the software application installed therein;

instructing the subscribing member to enter the subscribing member's user name and password when conducting the purchase transaction with the merchant via the global computer network; and entering anonymous information in an order placement screen of the merchant on behalf of the subscribing member to avoid revealing any unnecessary personal identity information of the subscribing member to the merchant.

38. The method as recited in claim 37 further comprising the steps of:

establishing an anonymous email address on behalf of the subscribing member;

providing the anonymous email address to the merchant;

receiving email communications from the merchant at the anonymous email address;

forwarding email communications from the merchant to the subscribing member at the subscribing member's real email address;

receiving email communications from the subscribing member via the subscribing member's real email address; and forwarding email communications from the subscribing member to the merchant via the anonymous email address without ever revealing the subscribing member's real email address to the merchant.

39. A method for protecting against theft of personal identity information during purchase transactions, said method comprising the steps of:

registering individual subscribers as members of an identity protection system and obtaining personal identity information from each individual member, including the subscribing member's name and account information for at least one financial account of the subscribing member, the at least one financial account being preexisting to and independent of membership, and being issued by a credit issuer that is external to the identity protection system, the identity protection system further performing:

receiving the personal identity information obtained from each subscribing member as storable computer data;

encrypting the entered personal identity information data by a computer;

fragmenting the encrypted data by a computer;

storing portions of the fragmented encrypted data, by at least one computer, independently at separate computer data storage locations;

preventing third party access to the fragmented encrypted data;

issuing an anonymous card from a plurality of pre-approved anonymous cards on behalf of the subscribing member for use to conduct at least one purchase transaction, each issued anonymous controlled use card having no traceable connection to any financial account of the subscribing member including the at least one financial account;

establishing at least one anonymous purchase account associated with the issued anonymous card;

requesting credit authorization of the credit issuer for a monetary value amount to be charged against the at least one financial account of the subscribing member and credited to the at least one anonymous purchase account of the anonymous card;

obtaining approval of the credit issuer for the monetary value amount and crediting the approved monetary value amount to the at least one anonymous purchasing account at the time of obtaining approval;

allowing the subscribing member to present the anonymous card to the merchant when conducting a card present purchase transaction without revealing the subscribing member's personal identity information to the merchant;

allowing the merchant to obtain credit approval and payment against the anonymous card for the card present purchase transaction up to the assigned and approved monetary value amount; and debiting the merchant payment against the at least one anonymous purchasing account to reduce the assigned authorized monetary value amount.

40. The method as recited in claim 39 wherein said at least one financial account of the subscribing member is a credit card account.

41. The method as recited in claim 40 wherein said account information obtained during said step of registering includes a plurality of credit card accounts.

42. A system for protecting against theft of personal identity information during purchase transactions, said system comprising:

at least one service provider center and an identity protection software application for registering individual subscribers as members and obtaining personal identity information from each individual member, including the subscribing member's name and account information for at least one financial account of the subscribing member, the at least one financial account being preexisting to and independent of membership, and being issued by a credit issuer that is external to the at least one service provider center, and the identity protection software application being structured and disposed for receiving the personal identity information as storable computer data;

a computer system for encrypting the entered personal identity information data;

a plurality of data storage locations;

said computer system being structured and disposed for fragmenting the encrypted data and storing portions of the fragmented encrypted data separately at the plurality of data storage locations;

said computer system being structured for issuing anonymous cards, each issued from a plurality of pre-approved cards on behalf of each subscribing member for exclusive use to conduct at least one purchase transaction with a specific merchant, the anonymous cards having no traceable connection outside the at least one service provider center to any financial account of the subscribing member including the at least one financial account;

said computer system being structured for requesting credit authorization of the credit issuer for a monetary purchase value amount to be charged against the at least one financial account of the subscribing member;

said computer system being further structured for obtaining approval for the monetary purchase value amount and assigning the approved monetary purchase value amount to the issued anonymous card;

said computer system being further structured for selecting a temporary card number from a plurality of pre-approved card numbers and assigning the selected temporary card number to the issued anonymous card at the time of obtaining approval for the monetary purchase value amount;

said computer system being further structured for presenting the anonymous card to a merchant when the subscribing member is conducting a purchase transaction with the merchant; and said computer system being further structured for allowing the merchant to obtain credit approval and payment against the anonymous card for the purchase transaction in an amount not exceeding the approved monetary purchase value amount and without revealing any personal identity information of the subscribing member.

* * * * *